United States Patent
Taira et al.

(10) Patent No.: US 6,774,196 B1
(45) Date of Patent: Aug. 10, 2004

(54) FLUOROCOPOLYMER AND FLUORORESIN COMPOSITION LOWLY PERMEABLE TO LIQUID CHEMICAL

(75) Inventors: Takahiro Taira, Settsu (JP); Takahisa Aoyama, Settsu (JP); Katsuhide Otani, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/148,230

(22) PCT Filed: Nov. 24, 2000

(86) PCT No.: PCT/JP00/08280
§ 371 (c)(1),
(2), (4) Date: May 28, 2002

(87) PCT Pub. No.: WO01/40331
PCT Pub. Date: Jun. 7, 2001

(30) Foreign Application Priority Data

Nov. 29, 1999 (JP) .......................................... 11-338452

(51) Int. Cl.⁷ .............................................. C08F 116/12
(52) U.S. Cl. ...................... 526/247; 526/250; 525/200
(58) Field of Search .............................. 526/250, 247; 525/200

(56) References Cited

U.S. PATENT DOCUMENTS 4,262,101 A * 4/1981 Hartwimmer et al. ........ 526/89

FOREIGN PATENT DOCUMENTS

| EP | 0 919 575 A1 | 6/1999 |
| JP | 7-18026 | 1/1995 |
| JP | 9-66570 | 3/1997 |
| JP | 11-10653 | 1/1999 |

OTHER PUBLICATIONS

International Search Report for PCT/JP00/08280 dated Feb. 27, 2001.

* cited by examiner

Primary Examiner—Bernard Lipman
(74) Attorney, Agent, or Firm—Sughrue Mion, PLLC

(57) ABSTRACT

To provide a novel PFA-based fluorine-containing copolymer having improved impermeability to liquid chemicals while retaining the excellent heat resistance, stress cracking resistance and processability inherent in PFA-based fluororesins, a material and a molded article useful in the field of semiconductor production apparatus and the like, using the copolymer. The present invention provides a fluorine-containing copolymer comprising 90 to 99.4% by mole of a repeating unit derived from tetrafluoroethylene, 0.5 to 5% by mole of a repeating unit derived from at least one lower perfluoro(alkyl vinyl ether) represented by the formula (1):

$$CF_2=CF-O-Rf^1 \qquad (1)$$

in which $Rf^1$ is a perfluoroalkyl group having 2 to 4 carbon atoms, and 0.1 to 5% by mole of a repeating unit derived from at least one higher perfluoro(vinyl ether) represented by the formula (2):

$$CF_2=CF-O-Rf^2 \qquad (2)$$

in which $Rf^2$ is a perfluoroalkyl group having 5 to 10 carbon atoms or a perfluoro(alkoxy alkyl) group having 4 to 17 carbon atoms, wherein the fluorine-containing copolymer has a melt flow rate of 0.1 g/10 minutes to 100 g/10 minutes and melting point of 290° to 325° C., and a resin composition using the same.

12 Claims, 1 Drawing Sheet

FLUOROCOPOLYMER AND FLUORORESIN COMPOSITION LOWLY PERMEABLE TO LIQUID CHEMICAL

TECHNICAL FIELD

The present invention relates to a novel fluorine-containing copolymer, a fluorine-containing resin composition which has excellent impermeability to liquid chemicals and a molded article using the same

BACKGROUND ART

In the field of producing semi-conductors, a large amount of liquid chemicals and water have been conventionally used in wet processes. A fluorine-containing resin having excellent chemical resistance, heat resistance and melt moldability is used for pipes transporting such liquid chemicals. Among fluorine-containing resins, a copolymer (PFA) of tetrafluoroethylene (TFE) and perfluoro(alkyl vinyl ether) (PAVE), particularly a copolymer of perfluoro(propyl vinyl ether) (PPVE), is excellent in chemical resistance, heat resistance, melt-moldability and stress cracking resistance, and thus preferably used for piping arrangements such as tubes and joints for transporting liquid chemicals.

However, these PFA piping arrangements have a problem of chemical liquid permeation in a small amount and needs some improvement. In current semiconductor production plants, there are some countermeasures such as covering the outside of a PFA tube with a pipe made of poly(vinyl chloride) (PVC) to make a double piping structure, or in the wet station area, exchanging PFA tubes regularly, wrapping them by a PVC film or further wiping the outside of a tube with a cloth.

These measures increase equipment and maintenance costs as might be expected, resulting in the increase of the cost for producing semiconductors.

As mentioned above, it is now practically difficult to solve the liquid chemical permeation problem of PFA in view of structure and maintenance, and therefore improvements are investigated with respect to its materials.

For example, there is a measure to use a fluorine-containing resin more impermeable to liquid chemicals, and among the fluorine-containing resins, it is effective to choose poly(chlorotrifluoroethylene) which is the most impermeable to liquid chemicals. However, this resin has a problem that it is poor in stress cracking resistance, moldability and heat resistance.

Furthermore, there is a way to increase crystallinity of PFA. It is effective to increase crystallinity since permeation of liquid chemical is generally observed at amorphous parts. As to PFA, it is possible to increase the crystallinity by decreasing the amount of perfluoro(alkyl vinyl ether) (PAVE). In this case, however, there arise defects that processability and crack resistance are decreased.

In addition, Japanese Unexamined Patent Publication No. 259216/1998 discloses the improvement of impermeability to liquid chemicals by modifying PFA using, as a third component, fluorovinyl ether which contains a reactive group such as a hydroxyl group. However, chemical resistance is decreased on the contrary since the terminal group of the modifying monomer is a reactive group represented by —$CH_2OH$. Further, permeability to liquid chemicals are evaluated only in terms of weight increase after immersing the material in fuming sulfuric acid for four weeks at room temperature, and there is no substantial description of the permeation amount of liquid chemical in the publication.

On the other hand, Japanese Unexamined Patent Publication No. 116706/1999 discloses a process for irradiating a molded article of a fluorine-containing resin such as PFA or a copolymer (FEP) of tetrafluoroethylene and hexafluoropropylene with ionizing radiation under inert gas atmosphere and at temperature of at least the melting point to cross-link the polymers, thereby improving gas barrier property. However, special apparatus is required for such treatment, and this is not preferable from an economical point of view.

An object of the present invention is to provide a melt-moldable fluorine-containing copolymer which can provide, in an economically efficient manner, a molded article having excellent impermeability to liquid chemicals while retaining the excellent heat resistance, stress resistance and processability inherent in PFA-based fluororesins, a fluorine-containing resin composition and a molded article using the same.

As a result of intensive studies, it has been found that chemical impermeability can be improved without losing inherent properties of a resin by modifying a tetrafluoroethylene copolymer using a particular perfluoro(alkyl vinyl ether) and the present invention has been completed.

DISCLOSURE OF INVENTION

The present invention relates to a fluorine-containing copolymer comprising 90 to 99.4% by mole of a repeating unit derived from tetrafluoroethylene, 0.5 to 5% by mole of a repeating unit derived from at least one lower perfluoro (alkyl vinyl ether) represented by the formula (1):

$$CF_2=CF-O-Rf^1 \qquad (1)$$

in which $Rf^1$ is a perfluoroalkyl group having 2 to 4 carbon atoms, and 0.1 to 5% by mole of a repeating unit derived from at least one higher perfluoro(vinyl ether) represented by the formula (2):

$$CF_2=CF-O-Rf^2 \qquad (2)$$

in which $Rf^2$ is a perfluoroalkyl group having 5 to 10 carbon atoms or a perfluoro(alkoxy alkyl) group having 4 to 17 carbon atoms, wherein the fluorine-containing copolymer has a melt flow rate of 0.1 g/10 minutes to 100 g/10 minutes and a melting point of 290° to 325° C.

It is preferable that $Rf^2$ in the higher fluoro(vinyl ether) represented by the formula (2) is a perfluoroalkoxyl group represented by the formula (3):

$$-(CF_2C(CF_3)FO)_n-Rf^3 \qquad (3)$$

in which n is an integer of 1 to 4 and $Rf^3$ is a perfluoroalkyl group having 1 to 5 carbon atoms.

BEST MODE FOR CARRYING OUT THE INVENTION

Figure 1:
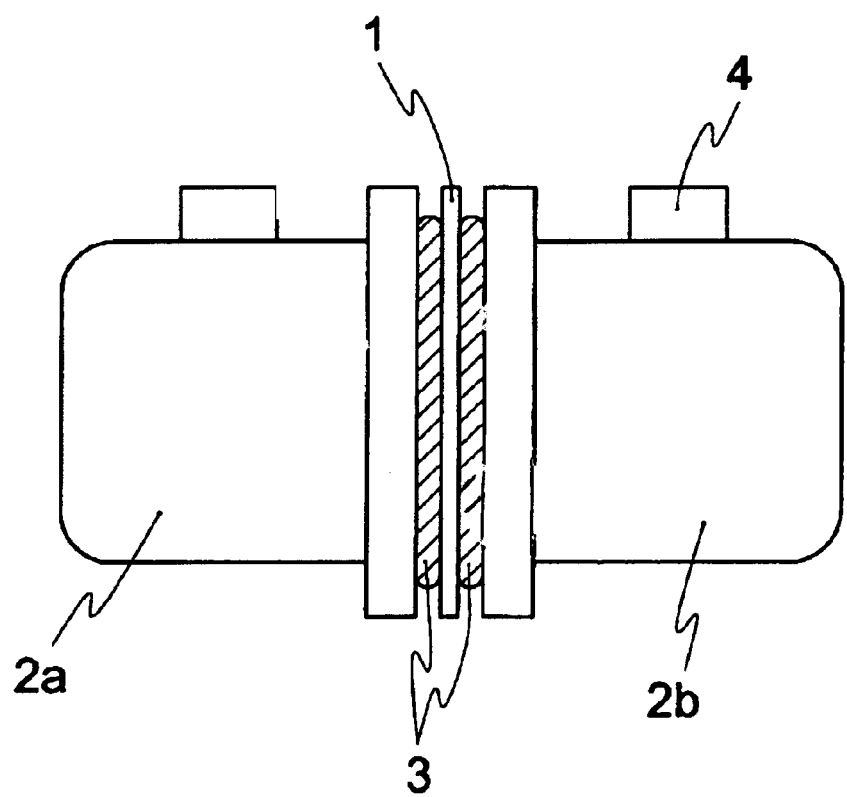
FIG. 1 is a schematic side view of the testing machine used for investigating liquid chemical permeability of the molded article of the present invention.

The novel copolymer of the present invention is a terpolymer comprising TFE, lower perfluro(alkyl vinyl ether) represented by the formula (1) and higher perfluoro(vinyl ether) represented by the formula (2).

Examples of lower perfluro(alkyl vinyl ether) represented by the formula (1) include perfluoro(ethyl vinyl ether), perfluoro(propyl vinyl ether), perfluoro(butyl vinyl ether) and the like. Among these, perfluoro(propyl vinyl ether) (PPVE) is preferable.

Examples of higher perfluro(alkyl vinyl ether) represented by the formula (2) include perfluoro(pentyl vinyl ether), perfluoro(hexyl vinyl ether), perfluoro(heptyl vinyl ether) and the like.

Further, as higher fluoro(alkoxy alkyl vinyl ether) represented by the formula (2), perfluoroalkoxyl group is preferable, whose $Rf^2$ is represented by the formula (3):

$$—(CF_2C(CF_3)FO)_n—Rf^3 \quad (3)$$

in which n is an integer of 1 to 4 and $Rf^3$ is a perfluoroalkyl group having 1 to 5 carbon atoms. Concrete examples thereof are $CF_2=CFO—(CF_2C(CF_3)FO)—CF_3$,
$CF_2=CFO—(CF_2C(CF_3)FO)_2—CF_3$,
$CF_2=CFO—(CF_2C(CF_3)FO)_3—CF_3$,
$CF_2=CFO—(CF_2C(CF_3)FO)—CF_2CF_3$,
$CF_2=CFO—(CF_2C(CF_3)FO)_2—CF_2CF_3$,
$CF_2=CFO—(CF_2C(CF_3)FO)_3—CF_2CF_3$,
$CF_2=CFO—(CF_2C(CF_3)FO)—CF_2CF_2CF_3$,
$CF_2=CFO—(CF_2C(CF_3)FO)_2—CF_2CF_2CF_3$,
$CF_2=CFO—(CF_2C(CF_3)FO)_3—CF_2CF_2CF_3$, and the like.

Among these, $CF_2=CFO—(CF_2C(CF_3)FO)—CF_2CF_2CF_3$, $CF_2=CFO—(CF_2C(CF_3)FO)_2—CF_2CF_2CF_3$ and $CF_2=CFO—(CF_2C(CF_3)FO)_3—CF_2CF_2CF_3$ are particularly preferable.

The composition among TFE, perfluro(alkyl vinyl ether) (1) having a short side chain represented by the formula (1) and perfluro(vinyl ether) (2) having a long side chain represented by the formula (2), namely TFE/(1)/(2), is 90 to 99.4/0.5 to 5/0.1 to 5 (% by mole), preferably 94 to 99.4/0.5 to 3.0/0.1 to 3.0 (% by mole).

When the unit of lower vinyl ether (1) is more than 5% by mole, heat resistance is decreased because crystallinity is decreased. When the unit of lower vinyl ether (1) is less than 0.5% by mole, melt-moldability and stress cracking resistance are decreased.

When the unit of higher vinyl ether (2) is more than 5% by mole, prevention effect on permeation is decreased because crystallinity is decreased. When the unit of higher vinyl ether (2) is less than 0.1% by mole, the prevention effect on permeation is insufficient because modification is too small.

Examples of suitable copolymers having a particularly excellent prevention effect on permeation are TFE/perfluoro(propyl vinyl ether)/$CF_2=CFO—(CF_2C(CF_3)FO)—CF_2CF_2CF_3$ (90 to 99.4/0.5 to 5/0.1 to 5), TFE/perfluoro(propyl vinyl ether)/$CF_2=CFO—(CF_2C(CF_3)FO)_2—CF_2CF_2CF_3$ (90 to 99.4/0.5 to 5/0.1 to 5), and TFE/perfluoro(propyl vinyl ether)/$CF_2=CFO—(CF_2C(CF_3)FO)_3—CF_2CF_2CF_3$ (90 to 99.4/0.5 to 5/0.1 to 5), but not particularly limited thereto.

Although some prior arts describe that at least two kinds of perfluoro(vinyl ether) may be used as copolymerization components for TFE (for example, Japanese Examined Patent Publication No. 83/1992 and Japanese Unexamined Patent Publication No. 304832/1995), there is no concrete example of copolymerizing particular perfluoro(vinyl ether) of the present invention, namely, lower perfluoro(alkyl vinyl ether) (1) with higher perfluoro(vinyl ether) (2) in a particular ratio. Further, it is not known that the fluorine-containing copolymer of the present invention has a specific effect such as excellent liquid chemical impermeability.

The fluorine-containing copolymer of the present invention has a melting point of 290° to 325° C. and a melt flow rate of 0.1 to 100 g/10 minutes, preferably 0.5 to 30 g/10 minutes. In particular, when the copolymer is molded into a tube, the melt flow rate is preferably 1 to 3 g/10 minutes in view of excellent stress cracking resistance and melt-moldability.

The polymerization process for obtaining the fluorine-containing copolymer of the present invention is not particularly limited. It is possible to obtain the copolymer under usual polymerization conditions employing emulsion polymerization, suspension polymerization, solution polymerization or bulk polymerization which are known to the person skilled in the art.

According to the present invention, it is possible to prepare a molded article whose permeability to liquid chemicals is inhibited. Specifically, a molded article is obtained, whose permeation amount of nitric acid is at most $2.0 \times 10^{-6}$ g.cm/cm$^2$, preferably at most $1.6 \times 10^{-6}$ g.cm/cm$^2$ after 40 days in a liquid chemical permeation test as mentioned below. That is, the present invention also relates to a molded article obtained by molding the fluorine-containing copolymer.

In addition, it is possible to obtain a molded article having further reduced nitric acid permeation by molding a fluorine-containing resin composition obtained by adding a liquid chemical permeation inhibitor to the fluorine-containing copolymer of the present invention.

The present invention therefore relates to a fluorine-containing resin composition comprising a fluorine-containing copolymer and a liquid chemical permeation inhibitor mentioned above.

The liquid chemical permeation inhibitor used in the present invention means an amorphous fluorine-containing copolymer or a fluorine-containing multi-segmented polymer comprising an amorphous fluorine-containing polymer chain segment.

Herein, "amorphous" means that the polymer has neither melting peak temperature (in case of temperature increase, Tm) nor crystallization peak temperature (in case of temperature decrease, Tc), but glass transition temperature (Tg) when measurement is carried out using a differential scanning calorimeter (DSC). In other words, there is substantially no crystallized area. On the other hand, "crystalline" means that the polymer has both Tm and Tc.

Additionally, the "amorphous" segment (A) and the "crystalline" segment (B) in the fluorine-containing multi-segmented polymer means a polymer which comprises the same repeating unit as that of each segment and satisfies the above definitions of "amorphous" or "crystalline".

The amorphous fluorine-containing polymer and the amorphous fluorine-containing polymer chain segment (A) of the fluorine-containing multi-segmented polymer as the liquid chemical permeation inhibitors used in the present invention, have a glass transition temperature (Tg). An amorphous polymer whose Tg is at most room temperature (25° C.) is referred to as an "elastomer", while those whose Tg is higher than 25° C. is referred to as a "resin". The elastomer with Tg of at most 25° C. is preferable in view of its high prevention effect on liquid chemical permeation and is suitably selected depending on the compatibility with the crystalline PFA to be used. However, the amorphous fluorine-containing polymer and the amorphous fluorine-containing polymer chain segment (A) used in the present invention may be an elastomer with Tg of at most 25° C. or a resin with Tg higher than 25° C.

The liquid chemical permeation inhibitor of the present invention means those comprising an amorphous fluorine-containing polymer or those comprising a fluorine-containing multi-segmented polymer. At first, the amorphous fluorine-containing polymer is explained.

The amorphous fluorine-containing polymer includes a fluorine-containing elastomer whose Tg is at most 25° C. and an amorphous fluorine-containing polymer resin whose Tg is higher than 25° C.

Examples of the fluorine-containing elastomer are a perfluoro elastomer such as tetrafluoroethylene-perfluoro(alkyl vinyl ether) copolymer; and a fluorine-containing elastomer having hydrogen atom such as a vinylidenefluoride-hexafluoropropylene copolymer, a vinylidenefluoride-hexafluoropropylene-tetrafluoroethylene copolymer, a vinylidenefluoride-chlorotrifluoroethylene copolymer or a vinylidenefluoride-chlorotrifluoroethylene-tetrafluoroethylene copolymer.

Among these, the TFE-PAVE copolymer is preferable as a liquid chemical permeation inhibitor for PFA from the viewpoint of the compatibility with PFA. Examples of perfluro(alkyl vinyl ether) (PAVE) for the TFE-PAVE copolymer are perfluofo(methyl vinyl ether), perfluofo(ethyl vinyl ether), perfluofo(propyl vinyl ether) and the like. The amount of PAVE is 10 to 50% by mole, preferably 20 to 50% by mole, where the TFE-PAVE copolymer has neither Tm nor Tc. Though the border between amorphousness and crystallinity of the copolymer lies in the range of 10 to 20% by mole, the TFE-PAVE copolymer can be used as the liquid chemical permeation inhibitor as long as it is amorphous.

The fluorine-containing elastomer can be prepared by a known polymerization process which is a process for preparing a fluorine rubber (U.S. Pat. No. 4,158,678 and U.S. Pat. No. 5,001,278).

For example, there is a process of carrying out emulsion polymerization under substantially no oxygen condition in an aqueous medium in the presence of an iodine compound, preferably a diiodine compound, with stirring under pressure using a radical polymerization initiator.

Typical examples of the diiodine compound are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. These compounds can be used alone or in combination thereof. Among these, 1,4-diiodoperfluorobutane is preferable. The amount of the diiodine compound is 0.01 to 1% by weight based on the total weight of the fluorine-containing monomer.

In addition, fluorine-containing elastomer may be prepared by copolymerizing an iodine-containing monomer in the present invention. As the iodine-containing monomer, perfluoro(vinyl ether) compounds are preferable in view of copolymerizability. For example, perfluoro(6,6dihydro-6-iodo-3-oxa-1-hexene) or perfluoro(5-iodo-3-oxa-1-pentene) is preferable as disclosed in Japanese Examined Patent Publication No. 63482/1993 and Japanese Unexamined Patent Publication No. 12734/1987.

The polymerization temperature is from about 10° to about 100° C. depending on properties of the initiator or kinds of monomers to be used. However, when the temperature is lower than 40° C., polymerization rate is low in case of using persulfate alone. Even in case of using a redox initiator to which sulfite salts or the like is added, polymerization rate is low and metal ion in the reducing agent remains in the polymer, which is not preferable for semiconductor production or the like.

The radical initiator to be used may be the same as conventional initiators employed for polymerization of a fluorine-containing elastomer. Examples of these initiators are organic or inorganic peroxides and azo compounds. Typical initiators are persulfates, carbonate peroxides, peroxide esters and the like, and a preferable initiator includes ammonium persulfate (APS). APS may be used alone or in combination with a reducing agent such as sulfites or sulfite salts. However, when cleanness is required, it is not recommended to use such reducing agents, which may generate metal ions.

As to the emulsifier used for emulsion polymerization, a wide variety of emulsifiers can be used, and fluorocarbon chain or fluoro polyether chain-containing carboxylate salts are preferable from the viewpoint of inhibiting the chain transfer reaction to emulsifier molecules during polymerization. The amount of emulsifier is preferably about 0.05 to 2% by weight, more preferably 0.2 to 1.5% by weight.

The polymerization pressure can be extensively changed, ranging from 0.5 to 5 MPa in general. The higher the polymerization pressure is, the higher the polymerization rate is, and therefore, the polymerization pressure is preferably at least 0.8 MPa from the viewpoint of improving productivity.

It is preferable to adjust the number average molecular weight of the thus-obtained fluorine-containing elastomer to 5,000 to 750,000, particularly 20,000 to 400,000, further particularly 50,000 to 400,000 since excellent mixing with the crystalline fluorine-containing resin is achieved.

The amorphous fluorine-containing polymer resin having Tg of higher than 25° C. includes an amorphous fluorine-containing polymer containing a cyclic structure in the main chain. Examples thereof are a tetrafluoroethylene-fluorodioxol copolymer (such as tetrafluoroethylene-fluoro-2,2-dimethyl-1,3-dioxol copolymer and the like as in Japanese Examined Patent Publication No. 18964/1988); or an amorphous fluorine-containing polymer which has a fluorine-containing aliphatic ring in the main chain and which is obtained by cyclic polymerization of a fluorine-containing monomer having at least two polymerizable double bonds, (for example, polymers obtained by cyclic polymerization of a perfluoro monomer such as perfluoro(allyl vinyl ether) and perfluoro(butenyl vinyl ether); or a copolymer of such perfluoro monomers and a radically polymerizable monomer including tetrafluoroethylene, chlorotrifluoroethylene or perfluoro(alkyl vinyl ether). Among these, perfluoro amorphous polymers such as a tetrafluoroethylene-perfluoro-2,2-dimethyl-1,3-dioxol copolymer and a perfluoro(allyl vinyl ether) copolymer are preferable from the viewpoints of heat resistance and chemical resistance.

Secondly, the fluorine-containing multi-segmented polymer is explained.

The fluorine-containing multi-segmented polymer used as the liquid chemical permeation inhibitor in the present invention comprises an amorphous fluorine-containing polymer chain segment (A) and a crystalline fluorine-containing polymer chain segment (B).

As the amorphous fluorine-containing polymer chain segment (A), there are an elastomeric one and a resin one as is the case with the above amorphous fluorine-containing polymer.

The elastomeric fluorine-containing polymer chain segment (A) is a segment whose Tg is at most 25° C. Examples thereof are the above copolymers listed as the fluorine-containing elastomer and this segment can be prepared by the iodine transfer polymerization mentioned above. When prepared by the iodine transfer polymerization, the segment has a perhalo terminal containing iodine atom, which can serve as a starting point for block copolymerization of the crystalline fluorine-containing polymer chain segment (B).

It is preferable to adjust the number average molecular weight of elastomeric fluorine-containing polymer chain segment (A) to 5,000 to 750,000, particularly 20,000 to 400,000, further particularly 50,000 to 400,000.

Particularly preferable examples of the elastomeric fluorine-containing polymer chain segment (A) include an elastomeric TFE-PAVE segment comprising a repeating unit derived from tetrafluoroethylene (TFE) and a repeating unit derived from perfluoro(alkyl vinyl ether). In this case, the amount of the PAVE repeating unit is such that the segment has Tg of at most 25° C. and does not have Tm and Tc, that is, 10 to 50% by mole, preferably 20 to 50% by mole. Though the border between amorphousness and crystallinity of the segment lies in the range of 10 to 20% by mole, those segments in the amorphous range should be used.

The crystalline fluorine-containing polymer chain segment (B) of the fluorine-containing multi-segmented polymer used in the present invention serves as an anchor when mixed with a crystalline fluorine-containing resin which is the matrix, in order to prevent the amorphous segment (A) from falling out from the matrix resin in the form of particles. Therefore, a segment compatible to the crystalline fluorine-containing resin is selected as the crystalline segment (B). Specifically, a segment comprising a repeating unit derived from tetrafluoroethylene (TFE) and a repeating unit represented by the formula (6):

$$CF_2=CF-Rf^4 \qquad (6)$$

in which $Rf^4$ represents $CF_3$ or $ORf^5$ ($Rf^5$ being a perfluoroalkyl group having 1 to 5 carbon atoms), and the amount of the repeating unit represented by the formula (6) is at most 20% by mole, preferably 0 to 10% by mole, more preferably 0 to 4% by mole. When the amount of the repeating unit represented by the formula (6) is more than 20% by mole, it is not preferable since the segment becomes amorphous and the anchoring effect becomes insufficient. Though the border between amorphousness and crystallinity of the segment lies in the range of 10 to 20% by mole, those segments in the crystalline range should be used.

Concrete examples of the monomer represented by the formula (6) include hexafluoropropylene (HFP), perfluoro(alkyl vinyl ether) (PAVE) and the like. Examples of PAVE are perfluoro(methyl vinyl ether) (PMVE), perfluoro(ethyl vinyl ether) (PEVE), perfluoro(propyl vinyl ether) (PPVE) and the like. Among these, PPVE is preferable from the viewpoint of its excellent compatibility with PFA.

Particularly preferable examples of the crystalline segment (B) include a PTFE segment essentially consisting of a repeating unit derived from TFE or a crystalline PFA segment.

The block copolymerization of the crystalline segment (B) with the amorphous segment (A) is carried out following the emulsion polymerization to obtain the amorphous segment (A), using monomers for the crystalline segment (B). The number average molecular weight of the crystalline segment (B) can be extensively adjusted to 1,000 to 1,200,000, preferably 3,000 to 400,000, more preferably 10,000 to 400,000.

The thus-obtained fluorine-containing multi-segmented polymer comprises a polymer (B—A—B) in which crystalline segments (B) are bound to both sides of the amorphous segment (A), and a polymer (A—B) in which a crystalline segment (B) is bound to one side of the amorphous segment (A), as a main segment.

In the present invention, the ratio of the amorphous segment (A) to the crystalline segment (B) is suitably adjusted within the above molecular weight range, but, for example, (A)/(B) is 10/90 to 99/1, preferably 25/75 to 95/5 in a weight ratio. The molecular weight of the fluorine-containing multi-segmented polymer is those which achieve excellent mixing with the crystalline fluorine-containing resin.

More specifically, combination of the following segments is available.

(1) The amorphous segment (A) is TFE-PMVE (80/20 to 50/50 in molar ratio) having a number average molecular weight of 50,000 to 400,000;

the crystalline segment (B) is TFE-PPVE (100/0 to 80/20 in molar ratio) having a number average molecular weight of 10,000 to 400,000; and segmented polymer structure: B—A—B.

This segmented polymer makes PFA sphaerites minute, has an anchoring effect, and is excellent in inhibiting liquid chemical permeation without lowering PFA properties.

By compounding these liquid chemical permeation inhibitors, the permeation amount of nitric acid is reduced by at least 30%.

In addition, it is preferable to subject the liquid chemical permeation inhibitor to fluorine gas treatment in order to improve heat resistance and for enhancing prevention effect on liquid chemical permeation of the molded article.

The fluorine gas treatment is carried out by contacting fluorine gas with the liquid chemical permeation inhibitor. However, reaction with fluorine generates much heat, and therefore it is preferable to dilute the fluorine gas with inert gas such as nitrogen gas. The amount of fluorine in the gas mixture comprising fluorine gas and inert gas is 1 to 100% by weight, preferably 10 to 25% by weight. The treatment temperature is 150° to 250° C., preferably 200° to 250° C., and the fluorine gas treatment time is 3 to 16 hours, preferably 4 to 12 hours. The pressure in the fluorine gas treatment ranges from 1 to 10 atm, but atmospheric pressure is preferable. In case of using the reactor under atmospheric pressure, the mixed gas of fluorine gas and inert gas is continuously passed through the reactor. As a result, unstable terminals in the liquid chemical permeation inhibitor are converted to —$CF_3$ terminals and then thermally stabilized. In addition, iodine bound to the fluorine-containing elastomer and the fluorine-containing multi-segmented polymer can be removed to the level as low as the detection limit.

The amount of the liquid chemical permeation inhibitor is 0.1 to 50 parts, preferably 0.25 to 20 parts by weight based on 100 parts by weight (hereinafter referred to as "part") of the fluorine-containing copolymer. When the amount of the liquid chemical permeation inhibitor is too large, there is a problem that mechanical strength is reduced.

As the molding process of the copolymer and the resin composition of the present invention, compression molding, transfer molding, extrusion molding, injection molding and blow molding are available, as is the case with conventional PFA.

Desired molded articles can be obtained according to such molding processes, and examples of the molded article include a sheet, a film, a packing, a round bar, a square bar, a pipe, a tube, a round bath, a square bath, a tank, a wafer carrier, a wafer box, a beaker, a filter housing, a flow meter, a pump, a valve, a cock, a connector, a nut and the like.

Among these, the molded article can be suitably used for tubes, pipes, tanks or connectors used for various chemical reaction apparatus, semiconductor production apparatus or liquid chemical feeders where impermeability to liquid chemical is particularly required.

Hereinafter, the present invention is explained in detail by means of examples, but is not limited thereto.

Firstly, measurements of each property were carried out according to the following procedures:

(1) Composition Analysis

Compositions of each polymer are determined according to both of the $^{19}$F-NMR method and the IR method.

(2) Thermal Decomposition Temperature

Thermal decomposition temperature means temperature (° C.) at which the weight of the polymer is decreased by 1.0% by weight at a temperature increase rate of 10° C./minute using a differential scanning calorimeter (RDC-220 made by Seiko Instruments Inc.).

(3) Melting Point

Melting point means a value (° C.) determined from the melting curve when temperature is increased at a temperature increase rate of 10° C./minute using a differential scanning calorimeter (RDC-220 made by Seiko Instruments Inc.).

(4) Melt Flow Rate (MFR)

Melt flow rate is a value (g/10 minutes) measured according to ASTM D 2116 at 372° C. under a load of 5 kg using a melt indexer (made by Toyo Seiki K. K.).

(5) MIT Value (Flexibility Fatigue Resistance)

A test piece is cut from a compression-molded sheet having a thickness of 0.20 to 0.23 mm, and measurement is carried out according to ASTM D2176 under the test conditions of a load of 12.15 N (1.25 kgf), a bending rate of 178 times/minute and a bending angle of 135° using a MIT flexibility fatigue resistance measuring machine (made by Toyo SeikiK.K.).

(6) Mechanical Strength

Mechanical strength is measured according to ASTM D 638 using a Tensilon tensile tester (made by Shimadzu Corporation). A test piece is cut from a compression-molded sheet having a thickness of 1.0 mm.

(7) Liquid Chemical Permeation Test

A sheet having a thickness of 0.2 mm and a diameter of 120 mm $\phi$ is prepared by compresion-molding using a heat press at 350° C.

The sample sheet 1 is interposed between two glass containers 2a and 2b (both having a capacity of 200 ml) by using fluorine rubber O-rings 3 as shown in FIG. 1. This unit is placed in a thermostat adjusted to 25° C. with filling the container 2a on one side of the sheet with 200 ml of 60% by weight nitric acid and the container 2b on the other side with 200 ml of pure water (liquid contact area of the sample sheet 1 is 70 mm$\phi$). The unit is allowed to stand in this state and liquid is sampled in an amount of about 1 ml from the sampling port 4 installed on the container 2b containing pure water after 40 days, and the concentration of nitric acid ion in pure water (Yppm) is quantified using an ion chromatograph (made by Yokogawa Electric Corporation, IC7000-E). The permeation amount of nitric acid is calculated based on the following equation:

$$X = Y \times 200 \times 0.02 \times 10^{-6} / (3.5 \times 3.5 \times 3.14)$$

EXAMPLE 1

An autoclave having an internal volume of 4.21 was charged with 100 ml of pure water. Then, after replacing the internal air with pure nitrogen gas sufficiently, the autoclave was evacuated and charged with 800 g of perfluoro(cyclo butane) as a solvent, 40 g of PPVE, 4 g of $CF_2=CFO-(CF_2C(CF_3)FO)_2-CF_2CF_2CF_3$ (hereinafter referred to as n=2VE) and 7.0 g of methanol. Stirring was carried out and the inside temperature was kept at 35° C. TFE is then pressed into the autoclave and the inside pressure of the autoclave was kept at 0.83 MPaG. As a polymerization initiator, 1.75 g of n-propylperoxy dicarbonate was added to start the reaction. Since the pressure decreases as the reaction proceeds, additional TFE was pressed thereinto to maintain the pressure at 0.83 MPaG. Stirring was stopped when the charged amount of TFE reached 230 g, and unreacted monomers and the solvent were purged out. The white powder generated in the autoclave was washed with water and then $CH_3CCl_2F$ (R-141b), and the powder was dried at 200° C. for 5 hours. An objective fluorine-containing copolymer was obtained in an amount of 236 g.

Properties of the copolymer including the permeation amount of nitric acid are shown in Table. 1.

EXAMPLE 2

An objective fluorine-containing copolymer was obtained in an amount of 245 g in the same manner as in Example 1 except for changing the amounts of n=2VE and methanol to 1.3 g and 2.0 g, respectively.

Properties of the copolymer including the permeation amount of nitric acid are shown in Table 1.

EXAMPLE 3

An objective fluorine-containing copolymer was obtained in an amount of 237 g in the same manner as in Example 1 except for changing the amounts of PPVE, n=2VE and methanol to 20 g, 13 g and 2.0 g, respectively.

Properties of the copolymer including the permeation amount of nitric acid are shown in Table 1.

EXAMPLE 4

An objective fluorine-containing copolymer was obtained in an amount of 245 g in the same manner as in Example 1 except for changing the amounts of PPVE and n=2VE to 30 g and 8 g, respectively.

Properties of the copolymer including the permeation amount of nitric acid are shown in Table 1.

EXAMPLE 5

An objective fluorine-containing copolymer was obtained in an amount of 237 g in the same manner as in Example 1 except for changing the amounts of PPVE, n=2VE and methanol to 35 g, 34 g and 2.0 g, respectively.

Properties of the copolymer including the permeation amount of nitric acid are shown in Table 1.

EXAMPLE 6

An objective fluorine-containing copolymer was obtained in an amount of 235 g in the same manner as in Example 1 except for changing the amounts of PPVE, n=2VE and methanol to 35 g, 34 g and 4.0 g, respectively.

Properties of the copolymer including the permeation amount of nitric acid are shown in Table 1.

EXAMPLE 7

(Synthesis of a Fluorine-containing Multi-segmented Polymer)

A stainless steel autoclave having an internal volume of 47 1 was charged with 30 1 of pure water, 300 g of $C_7F_{15}COONH_4$ as an emulsifier and 300 g of disodium hydrogenphosphate 12 hydrate as a pH regulator. The internal air was replaced with nitrogen gas sufficiently and then the temperature was elevated to 50° C. with stirring at 200 rpm. A mixed gas of tetrafluoroethylene (TFE) and perfluoro (methyl vinyl ether) (PMVE) (TFE/PMVE=32/68 in a molar ratio) was added thereto so that the inside pressure became 0.78 MPaG. Then, 100 ml of an aqueous solution containing 55.8 mg/ml of ammonium persulfate (APS) was pressed into the autoclave with nitrogen pressure to initiate the reaction.

When the inside pressure decreased to 0.69 MPaG with the progress of the polymerization, a mixture of 27.24 g of a diiodine compound $I(CF_2)_4I$ and 234 g of an aqueous solution containing 10% by weight of $C_7F_{15}COONH_4$ was pressed into the autoclave with nitrogen pressure. Subsequently, 60 g of TFE and 58 g of PMVE (TFE/PMVE= 63/37 in a molar ratio) were pressed thereinto with self pressure and by a plunger pump, respectively, so that the pressure was set to 0.78 MPaG. After that, TFE and PMVE were pressed thereinto similarly as the reaction proceeds, and pressure up and pressure down were repeated between 0.69 to 0.78 MPaG.

When the total amount of TFE and PMVE reached 6,000 g twelve hours after the start of the polymerization reaction, the autoclave was cooled, unreacted monomers were removed and an aqueous dispersion whose solid content concentration was 18.04% by weight was obtained.

Part of the aqueous dispersion was sampled, frozen and coagulated. The aqueous dispersion was then thawed, and the coagulate was washed with water and dried under vacuum to obtain an elastomeric amorphous polymer. The polymer had a Mooney viscosity $ML_{1+10}$ (100° C.) of 94 and a limiting viscosity [η] of 0.654 dl/g.

As a result of $^{19}$F-NMR analysis, the composition of monomer units of the polymer was TFE/PMVE=60/40% by mole, and the polymer had a Tg (medium value) of 2° C. according to DSC analysis.

A stainless steel autoclave having an internal volume of 3 l was charged with 349 g of the aqueous dispersion of the amorphous polymer obtained above, 685 g of pure water, 26.4 g of PPVE. The internal air was replaced with nitrogen gas sufficiently and the temperature was maintained at 80° C. With stirring at 400 rpm, TFE was pressed into the autoclave so that the inside pressure became 0.78 MPaG.

Thereafter, a solution obtained by dissolving 10 mg of ammonium persulfate into 2 ml of water was pressed into the autoclave by using nitrogen and the reaction was started.

Since the pressure decreases as the polymerization reaction proceeds, re-pressurization was carried out to 0.78 MPaG when the pressure decreased to 0.69 MPaG. Pressure up and pressure down were repeated between 0.69 and 0.78 MPaG.

When the consumption of TFE amounted to 189 g from the start of the polymerization, supply of TFE was stopped, the autoclave was cooled and unreacted monomers were removed to obtain 1231 g of a semitransparent aqueous dispersion.

The obtained aqueous dispersion had a solid content concentration of 20.2% by weight and a particle diameter of 82.3 nm when measured by a dynamic light scattering method.

Owing to the increase of the obtained amount of the polymers, the calculated ratio of the crystalline fluorine-containing polymer chain segment (B) to the total polymers, namely, {(polymer amount obtained at post-polymerization)−(charged amount of polymers)}÷(polymer amount obtained at post-polymerization), was 75% by weight.

The obtained aqueous dispersion was frozen and coagulated. Coagulated polymers were washed and dried, and white solid substance was obtained.

The composition of the crystalline fluorine-containing polymer chain segment (B) in the obtained fluorine-containing multi-segmented polymer was TFE/PPVE=97.1/2.9% by mole according to $^{19}$F-NMR analysis. In addition, according to DSC analysis, the amorphous fluorine-containing polymer chain segment (A) had no Tm and Tc but Tg of 2° C. while the crystalline fluorine-containing polymer chain segment (B) had Tm of 312.7° C. and Tc of 294.3° C. The multi-segmented polymer had MFR of 11 g/10 minutes.

(Preparation of Fluorine-containing Resin Composition)

A fluorine-containing resin composition was prepared by melt-kneading 1 part of the liquid chemical permeation inhibitor comprising the fluorine-containing multi-segmented polymer produced above with 100 parts of PFA synthesized in Example 6. Each component was put into a roller mixer type R-60H (mixer capacity: about 60 ml) made by Toyo Seiki K.K. and melt-kneading was carried out at 350° C. for 10 minutes at a rotation speed of 15 rpm.

The obtained fluorine-containing resin composition was treated with fluorine in the following manner.

The fluorine-containing resin composition in a special tray was placed in a box-shaped reaction oven and the oven was sealed. Replacement with nitrogen gas was sufficiently carried out and a mixed gas of fluorine gas and nitrogen gas (concentration of fluorine gas: 20% by weight) was passed at a flow rate of 0.6 l/minute for 5 hours. The inside of the oven was maintained at atmospheric pressure at 230° C.

After the reaction, heating was stopped and the mixed gas was changed to nitrogen gas to remove fluorine gas sufficiently over about 2 hours.

Properties of the fluorinated fluorine-containing resin composition including nitric acid permeation amount are shown in Table 1.

Comparative Example 1

A TFE-PPVE copolymer in an amount of 235 g was obtained in the same manner as in Example 1 except for charging no n=2VE.

Properties of the compolymer including nitric acid permeation amount are shown in Table 1.

TABLE 1

| | Composition of copolymer (composition) (% by mole) | | | Melting point | MFR | MIT (ten thousand times) | Temperature at which weight is decreased by 1% (° C.) | Permeation amount of liquid chemical |
|---|---|---|---|---|---|---|---|---|
| | TFE | PPVE | n = 2VE | (° C.) | (g/10 minutes) | | | (g · cm/cm$^2$) |
| Ex. 1 | 98.1 | 1.7 | 0.2 | 303 | 3.4 | 87 | 467 | 1.39 × 10$^{-6}$ |
| Ex. 2 | 99.0 | 0.8 | 0.2 | 304 | 2.0 | 152 | 467 | 1.06 × 10$^{-6}$ |
| Ex. 3 | 99.1 | 0.7 | 0.2 | 302 | 0.5 | 232 | 478 | 1.22 × 10$^{-6}$ |

TABLE 1-continued

|  | Composition of copolymer (composition) (% by mole) | | | Melting point | MFR | MIT (ten thousand | Temperature at which weight is decreased by | Permeation amount of liquid chemical |
| --- | --- | --- | --- | --- | --- | --- | --- | --- |
|  | TFE | PPVE | n = 2VE | (° C.) | (g/10 minutes) | times) | 1% (° C.) | (g · cm/cm$^2$) |
| Ex. 4 | 98.6 | 1.2 | 0.2 | 305 | 1.3 | 181 | 474 | $1.51 \times 10^{-6}$ |
| Ex. 5 | 97.3 | 1.9 | 0.8 | 304 | 1.4 | 186 | 459 | $1.40 \times 10^{-6}$ |
| Ex. 6 | 97.2 | 1.8 | 1.0 | 300 | 6.7 | 100 | 458 | $1.34 \times 10^{-6}$ |
| Ex. 7 | Composition of Ex. 6 and liquid chemical permeation inhibitor (100/1 in weight ratio) | | | — | 6.8 | 120 | 458 | $7.08 \times 10^{-7}$ |
| Com. Ex. 1 | 97.9 | 2.1 | 0 | 304 | 2.0 | 240 | 477 | $2.34 \times 10^{-6}$ |

The results in Examples 1 to 6 (in Table 1) show that the permeation amounts of liquid chemical of the fluorine-containing terpolymers modified by higher perfluoro(vinyl ether) (2) (n=2VE) is reduced by as much as at least 30% compared to copolymer of Comparative Example 1. Furthermore, the results of Example 7 show that the permeation amount of nitric acid was reduced by at least 30% by adding only 1% by weight of the fluorine-containing multi-segmented polymer as a liquid chemical permeation inhibitor.

In addition, the novel fluorine-containing copolymers obtained in the present invention do not show any remarkable lowering of melting point or decomposition temperature and maintains heat resistance as high as that of Comparative Example 1. Further, there is no remarkable decrease of MIT value, which means that excellent flexible resistance is maintained. Accordingly, the obtained copolymers are most suitable for tubes, pipes, tanks or connectors used for semiconductor production apparatus.

INDUSTRIAL APPLICABILITY

According to the present invention, novel fluorine-containing copolymers obtained by modification using perfluoro(vinyl ether) having a long side chain provide improved prevention capability of liquid chemical permeation while retaining inherent and excellent heat resistance, stress cracking resistance and processability. Molded articles obtained from the copolymer or the resin composition comprising the copolymer and a liquid chemical permeation inhibitor are suitable as a material to be used in the field of semiconductor production apparatus and the like.

What is claimed is:

1. A fluorine-containing copolymer comprising 90 to 99.4% by mole of a repeating unit derived from tetrafluoroethylene, 0.5 to 5% by mole of a repeating unit derived from at least one lower perfluoro(alkyl vinyl ether) represented by the formula (1):

$$CF_2\!\!=\!\!CF\!\!-\!\!O\!\!-\!\!Rf^1 \tag{1}$$

in which $Rf^1$ is a perfluoroalkyl group having 2 to 4 carbon atoms, and 0.1 to 5% by mole of a repeating unit derived from at least one higher perfluoro(vinyl ether) represented by the formula (2):

$$CF_2\!\!=\!\!CF\!\!-\!\!O\!\!-\!\!Rf^2 \tag{2}$$

in which $Rf^2$ is a perfluoro(alkoxy alkyl) group having 4 to 17 carbon atoms, wherein the fluorine-containing copolymer has a melt flow rate of 0.1 g/10 minutes to 100 g/10 minutes and melting point of 290° to 325° C.

2. The copolymer of claim 1, wherein $Rf^2$ in the formula (2) is perfluoro(alkoxy alkyl) group represented by the formula (3):

$$-\!(CF_2C(CF_3)FO)_n\!\!-\!\!Rf^3 \tag{3}$$

in which n is an integer of 1 to 4 and $Rf^3$ is a perfluoroalkyl group having 1 to 5 carbon atoms.

3. A fluorine-containing resin composition comprising 0.1 to 50 parts by weight of a fluorine-containing multi-segmented polymer comprising (A) an amorphous polymer chain segment which comprises a tetrafluoroethylene-perfluoro(alkyl vinyl ether) copolymer and (B) a crystalline polymer chain segment which comprises 80 to 100% by mole of a repairing unit derived from tetrafluoroethylene and 0 to 20% by mole of a repairing unit represented by the formula (6):

$$CF_2\!\!=\!\!CF\!\!-\!\!Rf^4 \tag{6}$$

in which $Rf^4$ is $CF_3$ or $ORf^5$ ($Rf^5$ is perfluoroalkyl group having 1 to 5 carbon atoms), or an amorphous polymer comprising tetrafluoroethylene perfluoro(alkyl vinyl ether) copolymer, based on 100 parts by weight of the copolymer of claim 1 or 2.

4. A fluorine-containing resin composition comprising 0.1 to 50 parts by weight of a fluorine-containing multi-segmented polymer comprising (A) an amorphous polymer chain segment which comprises a tetrafluoroethylene-perfluoro(alkyl vinyl ether) copolymer and (B) a crystalline polymer chain segment which comprises 80 to 100% by mole of a repeating unit derived from tetrafluoroethylene and 0 to 20% by mole of a repeating unit represented by the formula (6):

$$CF_2\!\!=\!\!CF\!\!-\!\!Rf^4 \tag{6}$$

in which $Rf^4$ is $CF_3$ or $ORf^5$ ($Rf^5$ is a perfluoroalkyl group having 1 to 5 carbon atoms), or an amorphous polymer comprising tetrafluoroethylene-perfluoro (alkyl vinyl ether) copolymer, based on 100 parts by weight of the copolymer of claim 2.

5. A molded article obtained by melt-molding the fluorine-containing copolymer of claim 1.

6. A molded article obtained by melt-molding the fluorine-containing copolymer of claim 2.

7. A molded article obtained by melt-molding the fluorine-containing resin composition of claim 3.

8. A molded article obtained by melt-molding the fluorine-containing resin composition of claim 4.

9. The molded article of claim 5, whose permeation amount of nitric acid is at most $2.0 \times 10^{-6}$ g.cm/cm$^2$ after 40 days in a liquid chemical permeation test.

10. The molded article of claim 6, whose permeation amount of nitric acid is at most $2.0 \times 10^{-6}$ g.cm/cm$^2$ after 40 days in a liquid chemical permeation test.

11. The molded article of claim 7, whose permeation amount of nitric acid is at most $2.0 \times 10^{-6}$ g.cm/cm$^2$ after 40 days in a liquid chemical permeation test.

12. The molded article of claim 8, whose permeation amount of nitric acid is at most $2.0 \times 10^{-6}$ g.cm/cm$^2$ after 40 days in a liquid chemical permeation test.

* * * * *

UNITED STATES PATENT AND TRADEMARK OFFICE
CERTIFICATE OF CORRECTION

PATENT NO. : 6,774,196 B1
DATED : August 10, 2004
INVENTOR(S) : Taira, Takahiro

It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154 (b) by 39 days. --

Signed and Sealed this

Twenty-eighth Day of June, 2005

JON W. DUDAS
*Director of the United States Patent and Trademark Office*